Patented Apr. 24, 1945

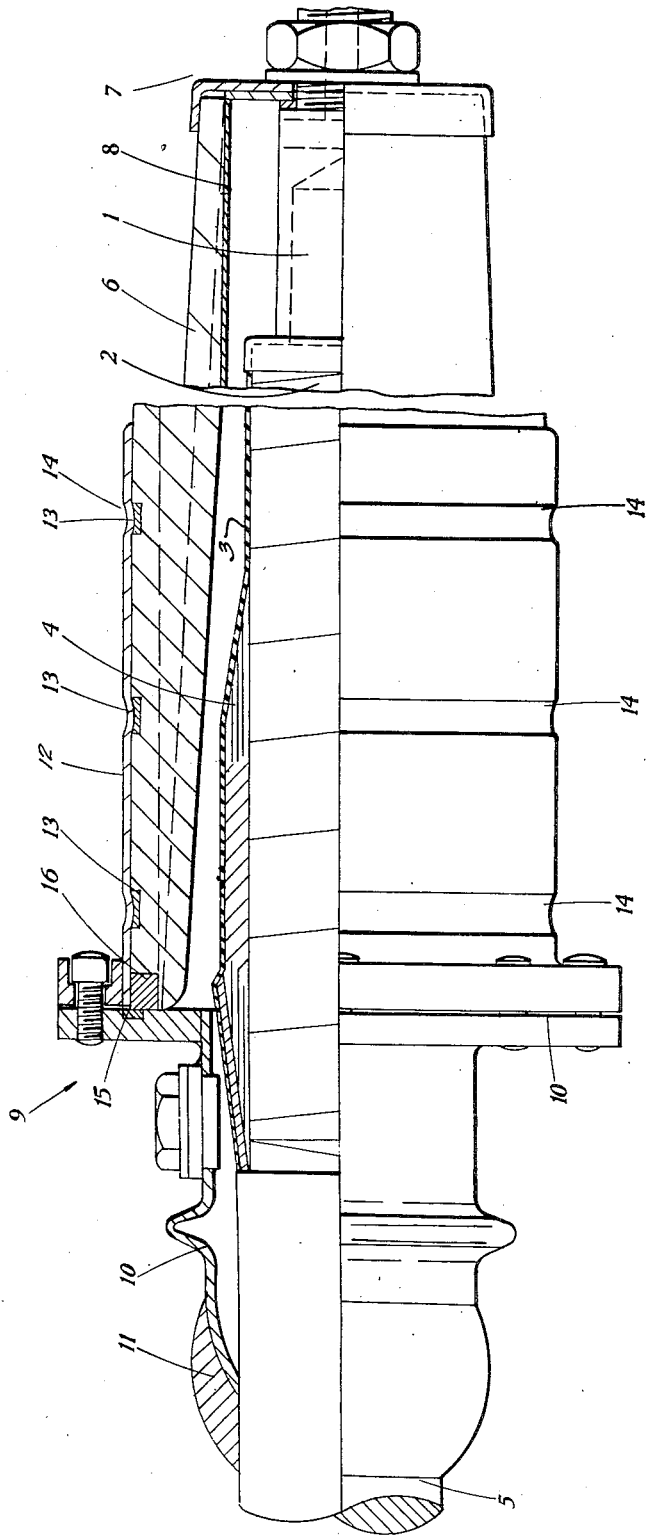

2,374,638

UNITED STATES PATENT OFFICE 2,374,638

ATTACHMENT OF METAL FITTINGS TO INSULATORS

Edwin Charles Lee, London W.C. 2, England, assignor to International Standard Electric Corporation, New York, N. Y.

Application February 4, 1942, Serial No. 429,574
In Great Britain April 25, 1941

1 Claim. (Cl. 174—20)

This invention relates to the attachment of metal fittings to insulators; examples of such insulators being styrenated bushings and condenser cones, and again porcelain or "Bakelite"-treated paper bushings.

When an insulator bushing is used to seal the termination of a cable it is usually desirable that the bushing should form a barrier between the oil or compound in the cable and that surrounding the bushing. In certain cases the internal pressure may be considerable due to the static head imposed by the contour of the cable together with the forces due to expansion of the oil or compound. An extreme case is that of the compression cable, where the pressure inside the bushing may reach the order of 14 atmospheres.

It is a relatively simple matter to design the insulated body of the bushing to withstand these pressures, but the weakest point is the attachment of the metal fittings required to make connection to the cable and busbars. This joint must be oil tight at the maximum working pressure and should be sufficiently flexible to accommodate any differential expansion between the materials employed.

The present invention provides a simple and inexpensive means of making this connection.

The invention consists in the manufacture of a joint between an insulating body and a metal sleeve by forming a peripheral groove in the body, inserting a rubber ring in the groove, to substantially fill the groove, fitting the sleeve, and forming a corresponding groove in the sleeve to put the rubber ring under pressure.

The accompanying drawing shows how the invention may be utilised for making an attachment to a styrenated condenser cone at the termination of a high-power cable, the drawing being an elevation in half-section on the centre line.

The cable, at its termination, comprises a core 1, a wrapping 2, a single layer of rubber styrene cotopa tape 3, a paper roll 4, and a metal sheath 5. The termination carries a styrenated condenser cone 6 which is supported at its forward end by an external copper cap 7 and an internal copper cap 8, and at its rearward end by a wiping sleeve assembly 9. The assembly 9 comprises a flanged sleeve 10 connected to the metal sheathing 5 by the wiped joint 11, and a copper sleeve 12 fitting closely over the cylindrical rear end of the condenser cone 6.

In the cylindrical end of the cone 6, one or more peripheral grooves are machined, being shown as of rectangular cross-section although any other may be used, and into these grooves rubber rings 13 are inserted. These rings have a cross-section substantially the same as that of the grooves, but their diameter is slightly smaller than the grooves so that they may be sprung into position and fit snugly into the grooves.

The copper sleeve 12 is a tight push fit on the bushing 6, and it has its internal surface tinned or otherwise coated to prevent chemical action with the rubber rings. Furthermore, it is desirable when fitting the sleeve to apply a varnish to the surfaces in order to seal the joint completed. When the sleeve is in place it is spun down onto the rubber rings, forming grooves 14 in the sleeve coinciding with the positions of the rubber rings; thus the latter are compressed and exert a pressure on all sides of the grooves, effectively preventing leakage. The diameter at the bottom of the groove is less than the outside diameter of the bushing so that there is no possibility of the latter being forced out of the fitting.

An increase in internal pressure will tend to produce a relative movement between the bushing and fitting thus increasing the compression of the rubber, and tightening the seal.

The rubber rings may be of an convenient composition to suit the nature of the oils or compounds used, temperature conditions, etc.

At the extreme end of the bushing, between the bushing and the flange on member 10, a complete seal is provided by an oil-resisting rubber washer 15 let into the face of the flange, and a filling 16 of solder which provides an electrical connection between the outer electrode of the condenser and the metal wiper assembly.

The drawing shows the seal fitted to one end only of the bushing. If required the idea may be applied to the other end, in which case the metal fitting would be expanded into grooves cut inside the bushing.

In the case of a plain bushing without foils, the two fittings would be similar to that shown on the drawing.

The process of rolling the grooves is very simple, and in practice a standard Renold "push-pull control" chain is used.

What is claimed is:

A relatively non-expansible oil tight joint between an expansible insulating body subject to internal pressure greater than atmospheric pressure and a metal sleeve embracing said body, said body being generally cylindrical, of a given external diameter, and having a peripheral groove therein, a resilient ring wholly within said groove and pressed below the surface of the given external diameter, and a relatively non-expansible metal sleeve having an internal diameter substantially equal to said given diameter arranged over said body, said sleeve having a corresponding radially inwardly-directed groove registering under pressure with the resilient ring.

EDWIN CHARLES LEE.